May 4, 1954
A. A. ABRAHAMSEN
2,677,210
FLOATING FISH TRAP
Filed Feb. 27, 1953
2 Sheets-Sheet 1
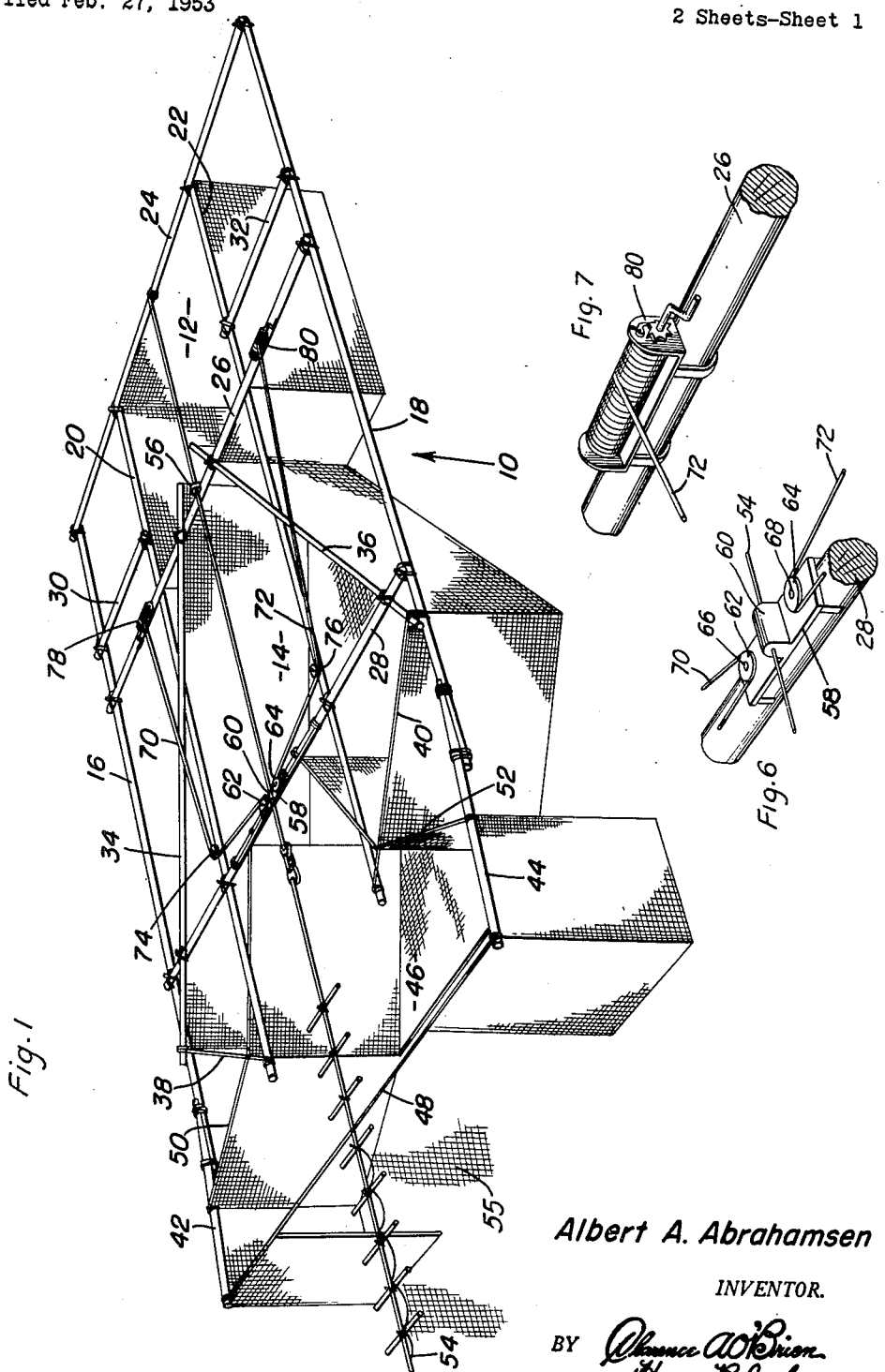
Albert A. Abrahamsen
INVENTOR.

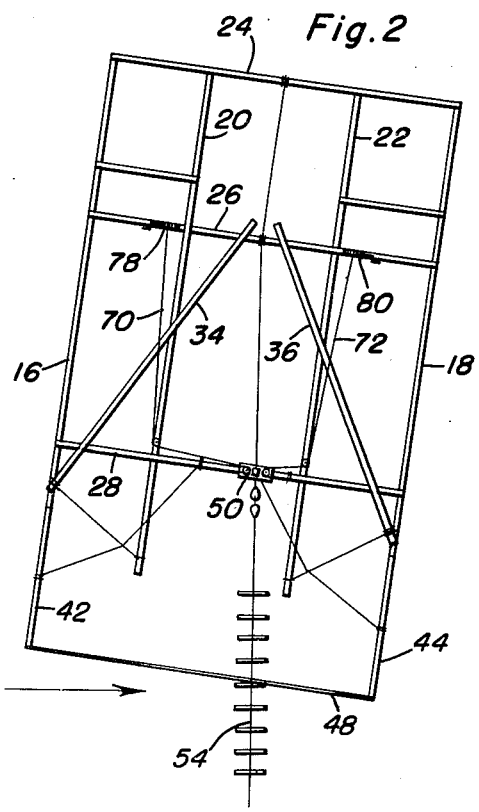
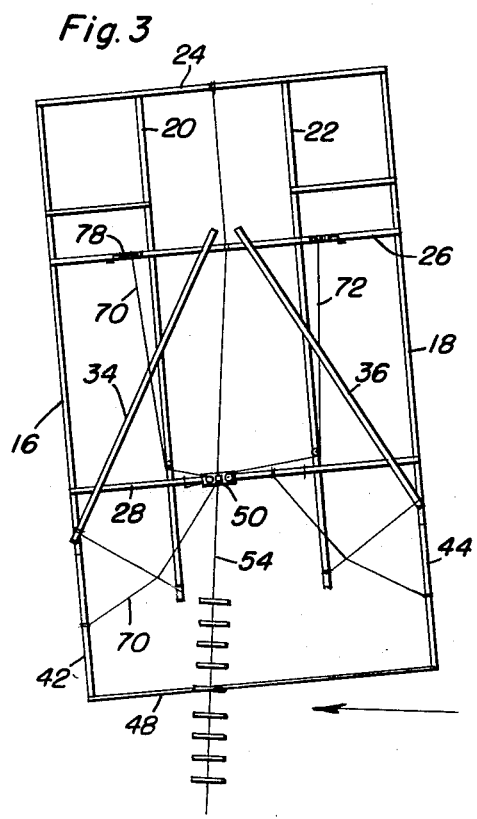
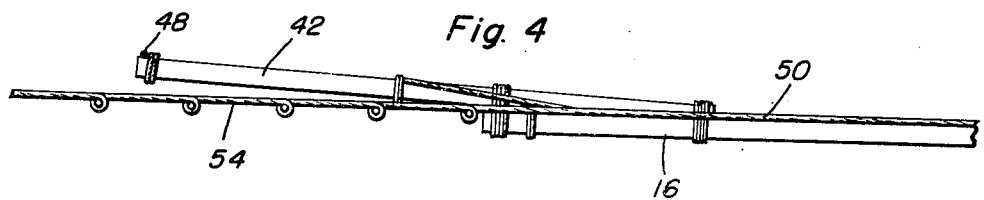
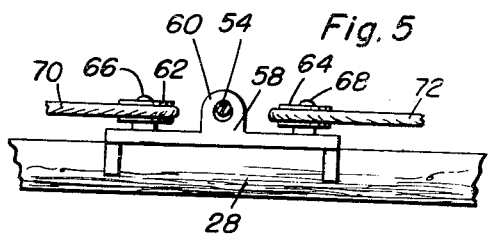
Albert A. Abrahamsen
INVENTOR.

Patented May 4, 1954

2,677,210

UNITED STATES PATENT OFFICE 2,677,210

FLOATING FISH TRAP

Albert A. Abrahamsen, Bellingham, Wash., assignor of twenty-five per cent to Condon V. Barclay, Sedro Valley, Wash.

Application February 27, 1953, Serial No. 339,280

7 Claims. (Cl. 43—103)

This invention relates to a floating fish trap capable of being moored to land or anchored and has for its particular object the means for moving the lead at the entrance or lead gap of the floating fish trap from side to side, depending upon the direction in which the tide is moving to thus utilize fishing space on the tide side to the greatest point of efficiency while closing the loosing or leeward side to prevent escape of fish, since many fish such as salmon tend to travel with the tide.

A further object of the invention resides in the provision of a jigger or hook that is so designed and constructed to provide means for stretching a reinforcing cable between the ends of the jigger above the lead cable, which wire cable further provides means for stretching netting to form the jigger or hook.

The construction of this invention features the use of a pair of winches mounted on a swifter log which control the movement of a plate mounted on another swifter log from side to side depending upon the direction or flow of tide and current. The lead extends through a guide mounted on the plate and thus the lead can be moved from side to side by action of the winches to position the floating fish trap relative to the lead.

Still further objects of the invention reside in the provision of a floating fish trap that is strong and durable, simple in construction, capable of being used to catch various types of fish, and which is highly efficient in operation yet relatively inexpensive to manufacture and maintain.

These, together with the various ancillary objects and features of the invention which will become apparent as the following description proceeds, are attained by this floating fish trap, a preferred embodiment of which has been illustrated in the accompanying drawings, by way of example only, wherein:

Figure 1 is a perspective view of the floating fish trap comprising the present invention;

Figures 2 and 3 are plan views indicating the desired position of the lead relative to the fish trap with reference to the direction of the tide as indicated by the arrows in the figure;

Figure 4 is a detail view showing the construction of the spars used in forming the jigger;

Figure 5 is an elevational detail of the plate and guide for the lead, the sheaves being shown mounted on the plate;

Figure 6 is a perspective view of a sliding plate forming an important element of the invention; and Figure 7 is a perspective view of one of the winches utilized in the invention.

With continuing reference to the accompanying drawings wherein like reference numerals designate similar parts throughout the various views, reference numeral 10 generally designates the floating fish trap comprising the present invention, which is constructed from a cable and log framework forming a pot 12 and a heart 14. The framework comprises a pair of outer logs 16 and 18 and a pair of spaced inner logs 20 and 22 which have secured thereto in overlying relationship swifter logs 24, 26 and 28. A pair of logs 30 and 32 are used to rigidify the structure at the pot 12. A pair of diagonally extending logs 34 and 36 extend inwardly and forwardly to form the arrow-head shaped heart 14. Cables or wire ropes 38 and 40 extend between the junctures of the logs 16 and 34 and 18 and 36 to the ends of the inner logs 20. Netting is suspended in the conventional manner from the various logs and wire ropes to form the chambers defining the pot 12 and the heart 14. Secured to the rearmost ends of the logs 16 and 18 are tapered logs 42 and 44 which extend upwardly and rearwardly to form a portion of the framework for a jigger or hook section 46 of the floating fish trap. The free ends of the tapered logs 42 and 44 are interconnected by a wire rope or cable 48. Two other cables 50 and 52 are secured at one end thereof medially the ends of the tapered logs 42 and 44 engage the cables 36 and 38 and are attached at their other ends to the swifter log 28. Netting is suspended from the cables 50 and 52, the cable 48, and a portion of the tapered logs 42 and 44 to form the jigger or hook 46.

A lead cable 54 is attached to the swifter log 24 and passes through a guide 56 mounted on the swifter log 26. There is provided a plate 58 having a guide 60 thereon through which the lead cable 54 extends. A pair of sheaves 62 and 64 are rotatably mounted on the plate 58 by means of pins 66 and 68 and cables 70 and 72 having ends thereof attached to the swifter log 28 outwardly from the center thereof are rove about the sheaves 62 and 64 disposed on slidable plate 58 and fair leaded about blocks 74 and 76 mounted on the logs 20 and 22. The ends of the cables 70 and 72 are entrained about winches 78 and 80 mounted on the swifter log 26.

The lead 54 may be provided with netting or guides as is conventional and as indicated by reference numeral 55.

Referring particularly to Figures 2 and 3, it will be noted that when the tide is running in the direction indicated by the arrow in Figure 2, the winch 80 may be wound to draw up on the cable 72 which the winch 78 is released to provide slack in the cable 70. This will then cause the fish trap 10 to be shifted to provide a greater opening through the hook or jigger at the lead gap to thus utilize the greatest amount of fishing space on the tide side while closing the loosing or leeward side thus hindering escape of fish. In like manner, when the tide is moving in the direction as shown by the arrow in Figure 3, the winch 80 may be loosened to provide slack in the cable 72 while the cable 70 is tightened using the winch 78. This will again shift the entire floating fish trap to again arrange the lead gap at the jigger for maximum efficiency.

Since from the foregoing, the construction and advantages of this floating fish trap are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

What is claimed as new is as follows:

1. A floating fishtrap comprising a log and cable framework with netting suspended therefrom forming a pot and a heart communicating with said pot, and a jigger secured to said framework extending angularly upwardly and rearwardly of said heart, said jigger including a transverse cable supported above the plane of said framework.

2. A floating fishtrap comprising a log and cable framework with netting suspended therefrom forming a pot and a heart communicating with said pot, said framework including spaced swifter logs, a lead secured to one of said swifter logs, and means carried by said swifter logs for adjusting the position of said lead relative to said heart to correspond to the direction of tide and current.

3. A floating fishtrap comprising a log and cable framework with netting suspended therefrom forming a pot and a heart communicating with said pot, and a jigger secured to said framework extending angularly upwardly and rearwardly of said heart, said jigger including a transverse cable supported above the plane of said framework, said framework including spaced swifter logs, a lead secured to one of said swifter logs, and means carried by said swifter logs for adjusting the position of said lead relative to said heart to correspond to the direction of tide and current.

4. A floating fishtrap comprising a log and cable framework with netting suspended therefrom forming a pot and a heart communicating with said pot, said framework including spaced swifter logs, a lead secured to one of said swifter logs, and means carried by said swifter logs for adjusting the position of said lead relative to said heart to correspond to the direction of tide and current, said means including a plate slidably positioned on a second of said swifter logs, and a guide secured to said plate, said lead extending through said guide on said plate.

5. A floating fishtrap comprising a log and cable framework with netting suspended therefrom forming a pot and a heart communicating with said pot, said framework including spaced swifter logs, a lead secured to one of said swifter logs, and means carried by said swifter logs for adjusting the position of said lead relative to said heart to correspond to the direction of tide and current, said means including a plate slidably positioned on a second of said swifter logs, a guide secured to said plate, said lead extending through said guide on said plate, said plate having a pair of sheaves attached thereto, and wire ropes each secured at one end thereof to said second swifter log outwardly from the center thereof, said sheaves being rove with said wire ropes, and the other ends of said wire ropes being entrained about winches mounted on a third swifter log.

6. A floating fishtrap comprising a log and cable framework with netting suspended therefrom forming a pot and a heart communicating with said pot, and a jigger secured to said framework extending angularly upwardly and rearwardly of said heart, said jigger including a transverse cable supported above the plane of said framework, said framework including spaced swifter logs, a lead secured to one of said swifter logs, and means carried by said swifter logs for adjusting the position of said lead relative to said heart to correspond to the direction of tide and current, said means including a plate slidably positioned on a second of said swifter logs, and a guide secured to said plate, said lead extending through said guide on said plate.

7. A floating fishtrap comprising a log and cable framework with netting suspended therefrom forming a pot and a heart communicating with said pot, and a jigger secured to said framework extending angularly upwardly and rearwardly of said heart, said jigger including a transverse cable supported above the plane of said framework, said framework including spaced swifter logs, a lead secured to one of said swifter logs, and means carried by said swifter logs for adjusting the position of said lead relative to said heart to correspond to the direction of tide and current, said means including a plate slidably positioned on a second of said swifter logs, and a guide secured to said plate, said lead extending through said guide on said plate, said plate having a pair of sheaves attached thereto, wire ropes each secured at one end thereof to said second swifter log outwardly from the center thereof, said sheaves being rove with said wire ropes, and the other ends of said wire ropes being entrained about winches mounted on a third swifter log.

References Cited in the file of this patent
UNITED STATES PATENTS

| Number | Name | Date |
|---|---|---|
| 699,084 | Dill | Apr. 29, 1902 |
| 969,970 | Moen | Sept. 13, 1910 |